(12) United States Patent
Dai et al.

(10) Patent No.: US 8,088,305 B2
(45) Date of Patent: Jan. 3, 2012

(54) LITHIUM IRON PHOSPHATE CATHODE MATERIAL

(75) Inventors: Quan Dai, Shenzhen (CN); Julin Shen, Shenzhen (CN); Feng Xiao, Shenzhen (CN)

(73) Assignee: BYD Company Limited (CN)

( * ) Notice: Subject to any disclaimer, the term of this patent is extended or adjusted under 35 U.S.C. 154(b) by 322 days.

(21) Appl. No.: 12/035,978

(22) Filed: Feb. 22, 2008

(65) Prior Publication Data

US 2010/0059706 A1    Mar. 11, 2010

(51) Int. Cl.
*B05D 3/02* (2006.01)

(52) U.S. Cl. ........ 252/511; 427/212; 427/226; 429/221; 429/231.95; 429/231.8; 429/408; 252/502

(58) Field of Classification Search ............ 252/500, 252/502, 506, 510, 511, 513, 519.3, 519.32, 252/519.33; 427/212, 226; 429/221, 231.95, 429/231.8

See application file for complete search history.

(56) References Cited

U.S. PATENT DOCUMENTS

| | | |
|---|---|---|
| 3,778,307 A | 12/1973 | Beer et al. |
| 4,394,280 A | 7/1983 | von Alpen et al. |
| 5,910,382 A | 6/1999 | Goodenough et al. |
| 6,514,640 B1 | 2/2003 | Armand et al. |
| 6,558,844 B2 | 5/2003 | Howard, Jr. et al. |
| 6,645,452 B1 | 11/2003 | Barker et al. |
| 6,702,961 B2 * | 3/2004 | Barker et al. .............. 252/518.1 |
| 6,835,500 B2 | 12/2004 | Masquelier et al. |
| 6,960,331 B2 | 11/2005 | Barker et al. |
| 6,964,830 B2 | 11/2005 | Takahashi |
| 7,025,907 B2 | 4/2006 | Kahzaki et al. |
| 7,172,834 B1 | 2/2007 | Jow et al. |
| 7,189,475 B2 | 3/2007 | Sasaki et al. |
| 7,255,965 B2 | 8/2007 | Xu et al. |
| 7,261,979 B2 | 8/2007 | Gozdz et al. |
| 7,338,734 B2 | 3/2008 | Chian et al. |
| 7,722,848 B2 | 5/2010 | Dai et al. |
| 2002/0047112 A1 * | 4/2002 | Hosoya et al. ............ 257/9 |
| 2002/0102459 A1 * | 8/2002 | Hosoya et al. ............ 429/221 |
| 2004/0005265 A1 * | 1/2004 | Chiang et al. ............ 423/306 |
| 2004/0151649 A1 | 8/2004 | Hemmer et al. |

(Continued)

FOREIGN PATENT DOCUMENTS

CN     1259773     7/2000

(Continued)

OTHER PUBLICATIONS

Hu, Huan-yu et al., "Influenece of the Mg-substitution on electrochemical performances of LiFePO4," China Academic Journal Electronic Publishing House, pp. 18-20, vol. 30, No. 1, 2006.

(Continued)

*Primary Examiner* — Mark Kopec
*Assistant Examiner* — Haidung Nguyen
(74) *Attorney, Agent, or Firm* — Greenberg Traurig LLP

(57) ABSTRACT

Described are lithium iron phosphate cathode materials for lithium secondary batteries and methods of preparation thereof. Better cathode materials may be produced by two carbon processes. The first carbon process comprises mixing lithium compounds, iron compounds, phosphorous compounds and a first carbon additive, and heating the mixture to a first temperature. The second carbon process comprises adding a second carbon additive to the to the product of the first carbon process and heating the mixture to a second temperature. The cathode material so produced exhibits superior electrical properties.

20 Claims, 2 Drawing Sheets

U.S. PATENT DOCUMENTS

| | | | |
|---|---|---|---|
| 2006/0083990 | A1 | 4/2006 | Adamson et al. |
| 2006/0236528 | A1 | 10/2006 | Xu et al. |
| 2007/0160752 | A1* | 7/2007 | Mao .............................. 427/212 |
| 2007/0166609 | A1 | 7/2007 | Lee et al. |
| 2007/0178370 | A1 | 8/2007 | Amine et al. |
| 2007/0184352 | A1* | 8/2007 | Donoue et al. ................. 429/338 |
| 2007/0207080 | A1* | 9/2007 | Yang .............................. 423/306 |
| 2007/0212606 | A1* | 9/2007 | Chang ............................ 429/221 |
| 2009/0081102 | A1 | 3/2009 | Dai |
| 2009/0106970 | A1 | 4/2009 | Fan |
| 2009/0148765 | A1 | 6/2009 | Cao et al. |
| 2009/0169984 | A1 | 7/2009 | Liang et al. |
| 2009/0191455 | A1 | 7/2009 | Gao et al. |
| 2009/0217512 | A1 | 9/2009 | Tian et al. |
| 2009/0217513 | A1 | 9/2009 | Xi et al. |
| 2009/0220856 | A1 | 9/2009 | Tian et al. |
| 2009/0220858 | A1 | 9/2009 | Cheng |
| 2009/0220860 | A1 | 9/2009 | Xi et al. |
| 2009/0302283 | A1 | 12/2009 | Xia et al. |
| 2010/0028771 | A1 | 2/2010 | Zhou et al. |
| 2010/0062339 | A1 | 3/2010 | Pan et al. |

FOREIGN PATENT DOCUMENTS

| | | | |
|---|---|---|---|
| CN | 1401559 | A | 3/2003 |
| CN | 1401559 | A | 3/2003 |
| CN | 1410349 | | 4/2003 |
| CN | 1424980 | | 6/2003 |
| CN | 1559889 | A | 1/2005 |
| CN | 1641912 | | 7/2005 |
| CN | 1648036 | A | 8/2005 |
| CN | 1677718 | A | 10/2005 |
| CN | 1762798 | | 4/2006 |
| CN | 1773754 | | 5/2006 |
| CN | 1775665 | A | 5/2006 |
| CN | 1797823 | | 7/2006 |
| CN | 1964125 | | 5/2007 |
| CN | 1986395 | | 6/2007 |
| CN | 1989649 | | 6/2007 |
| CN | 101047268 | | 10/2007 |
| CN | 101087021 | * | 12/2007 |
| CN | 101106189 | * | 1/2008 |
| CN | 101128950 | | 2/2008 |
| CN | 101207197 | | 6/2008 |
| CN | 101209827 | | 7/2008 |
| CN | 101212048 | | 7/2008 |
| CN | 101399343 | | 4/2009 |
| CN | 101420048 | | 4/2009 |
| CN | 101453019 | | 6/2009 |
| CN | 101471432 | | 7/2009 |
| CN | 101478041 | | 7/2009 |
| CN | 101478042 | | 7/2009 |
| CN | 101494305 | | 7/2009 |
| EP | 1553647 | | 7/2005 |
| EP | 1855334 | | 11/2007 |
| WO | 9740541 | | 10/1997 |
| WO | WO 2005/076936 | A2 | 8/2005 |
| WO | 2006066470 | | 6/2006 |
| WO | 2006112674 | | 10/2006 |
| WO | 2008109734 | | 9/2008 |

OTHER PUBLICATIONS

Related U.S. Appl. No. 12/127,431, entitled "Lithium Iron-Phosphate Cathode Material," Final Office Action (mailed Jun. 26, 2009).
Related U.S. Appl. No. 12/127,431, entitled "Lithium Iron-Phosphate Cathode Material," Non-Final Office Action (mailed Jan. 30, 2009).
Yun et al., "Synthesis and electrochemcial properties of olivine-type LiFePO4/C composite cathode material prepared from a poly(vinyl alcohol)-containg precursor." Journal of Power Sources vol. 160, issue 2, Oct. 2006, pp. 1361-1368 (Available online May 9, 2006).
European Search Report for EP09400001 (mailed Apr. 14, 2009).
International Patent Application Serial No. PCT/CN08/70391, International Search Report and Written Opinion (mailed Jul. 17, 2008).
Pei, Su-hua et al., "Sensitivity of $TiO^2$ : $NB2O5$ composite crystalliod to trimethylamine", Journal of Functional Materials and Devices, vol. 12, No. 3, Jun. 2006.
USPTO Transaction History of related U.S. Appl. No. 12/040,773, filed Feb. 29, 2008, entitled "Composite Compound with Mixed Crystalline Structure."
USPTO Transaction History of related U.S. Appl. No. 12/053,308, filed Mar. 21, 2008, entitled "Cathode Materials for Lithium Batteries."
USPTO Transaction History of related U.S. Appl. No. 12/127,431, filed May 27, 2008, entitled "Lithium Iron Phosphate Cathode Material."
USPTO Transaction History of related U.S. Appl. No. 12/198,087, filed Aug. 25, 2008, entitled "Lithium-Ion Rechargeable Battery Preparation."
USPTO Transaction History of related U.S. Appl. No. 12/254,537, filed Oct. 20, 2008, entitled "Lithium Iron(II) Phosphate Cathode Active Material."
USPTO Transaction History of related U.S. Appl. No. 12/273,649, filed Nov. 19, 2008, entitled "Composite Separator Films for Lithium-Ion Batteries."
USPTO Transaction History of related U.S. Appl. No. 12/316,165, filed Dec. 9, 2008, entitled "Composite Compound with Mixed Crystalline Structure."
USPTO Transaction History of related U.S. Appl. No. 12/316,173, filed Dec. 9, 2008, entitled "Composite Compound with Mixed Crystalline Structure."
USPTO Transaction History of related U.S. Appl. No. 12/316,180, filed Dec. 9, 2008, entitled "Composite Compound with Mixed Crystalline Structure."
USPTO Transaction History of related U.S. Appl. No. 12/316,234, filed Dec. 9, 2008, entitled "Composite Compound with Mixed Crystalline Structure."
USPTO Transaction History of related U.S. Appl. No. 12/352,981, filed Jan. 13, 2009, entitled "Electrolyte for Batteries and Battery Packs."
USPTO Transaction History of related U.S. Appl. No. 12/436,347, filed May 6, 2009, entitled "Transition Metal Hydroxide and Oxide, Method of Producing the Same, and Cathode Material Containing the Same."
USPTO Transaction History of related U.S. Appl. No. 12/482,690, filed Jun. 11, 2009, entitled "Electrolyte for Lithium Batteries."
Related U.S. Appl. No. 12/127,431, entitled "Lithium Iron-Phosphate Cathode Material," Non-Final Office Action (mailed Oct. 20, 2009).

* cited by examiner

LITHIUM IRON PHOSPHATE CATHODE MATERIAL

FIELD OF THE INVENTION

The embodiments of the present invention relate to batteries, more specifically, to a lithium iron phosphate cathode material for lithium secondary batteries.

BACKGROUND

Lithium secondary batteries are widely used and can be found in laptop computers, cameras, camcorders, PDAs, cell phones, iPods and other portable electronic devices. These batteries are also growing in popularity for defense, automotive and aerospace applications because of their high energy density.

Lithium phosphate-based cathode materials for secondary battery have long been known in the battery industry. People have used metal intercalation compound to improve the electrical property of lithium phosphate. One popular intercalation compound is lithium iron phosphate ($LiFePO_4$). Because of its non-toxicity, thermal stability, safety characteristics and good electrochemical performance, there is a growing demand for rechargeable lithium secondary batteries with $LiFePO_4$ as the cathode material.

The present invention teaches a better method of making lithium iron phosphate and other metal intercalation compound for cathode materials of secondary batteries. The prior art methods often result in incomplete reduction of trivalent iron ($Fe^{3+}$). This incomplete reduction causes poor electrical performance of the battery, especially when high electrical discharge is required such as for batteries used in electrical vehicles.

As such, there is a need for a better manufacturing process for lithium iron phosphate cathode material.

SUMMARY

A first embodiment of the present invention discloses a method of preparing a cathode material for lithium secondary batteries comprising: providing a mixture with at least one lithium compound, at least one iron compound, at least one phosphorous compound and a first carbon additive; heating the mixture to a first temperature; providing a second carbon additive to the mixture; and heating the mixture to a second temperature. In another embodiment, the product from the first heating step can be grinded before adding the second carbon additive.

In one embodiment, the first carbon additive and the second carbon additive have a weight ratio of about 2-10 to 1. In another embodiment, the amount of the first carbon additive and the second carbon additive are such that the carbon content of the final cathode material is about 1-15% of carbon by weight. The second carbon additive may include un-reacted portions of the first carbon additive. In other embodiments, the lithium, iron and phosphorous compounds provide Li:Fe:P molar ratios of about 0.9-1.2:1:1.

In a second embodiment, the iron compound is a trivalent iron compound. In one embodiment, the first carbon additive provides about 5-10 grams carbon for every mole of trivalent iron compound. The trivalent iron compounds may include one or more substances from the following group: $Fe_2O_3$, $FePO_4$, $Fe(NO_3)_3$ and $Fe_3O_4$. In other embodiments, the second heating temperature is at least 80° C. higher than the first heating temperature. In another embodiment, for the first heating step, the reaction mixture is heated to 500-700° C. for 5-20 hours; for the second heating step, the mixture is heated to 700-900° C. 5-20 hours. The first and second heating steps can be carried out in an inert atmosphere.

In a third embodiment, the iron compound is a divalent iron compound. Such compound may include one or more substances from the following group: $Fe_2C_2O_4$, $Fe(CH_3COO)_2$, $FeCl_2$, $FeSO_4$ and $Fe_3(PO_4)_2$. In another embodiment, for the first heating step, the reaction mixture is heated to 300-500° C. for 5-15 hours; for the second heating step, the mixture is heated to 600-800° C. for 5-20 hours.

A fourth embodiment of the present invention discloses a method of preparing a cathode material for lithium secondary batteries comprising: providing a mixture with at least one lithium compound, at least one iron compound, at least one phosphorous compound, at least one metal compound and a first carbon additive; heating the mixture to a first temperature; providing a second carbon additive to the mixture.

In one embodiment, the first carbon additive and the second carbon additive has a weight ratio of about 2-10 to 1. The first carbon additive and the second carbon additive provide the cathode material with carbon content of about 1-15% by weight. The second carbon additive may include un-reacted portions of the first carbon additive. The lithium, metal, iron and phosphorous compounds provide Li:M:Fe:P molar ratios of about 0.9-1.2:0.01-0.05:0.95-0.99:1.

A fifth embodiment of the present invention discloses a composition of materials for making cathodes of lithium secondary batteries comprising: at least one lithium compound; at least one iron compound; at least one phosphorous compound; and a first carbon additive and a second carbon additive, wherein the second carbon additive is added to the composition only after the mixture of said lithium compound, said iron compound, said phosphorous compound and said first carbon additive were heated.

In one embodiment, the weight ratio of the first carbon additive to the second carbon additive is about 2-10 to 1. The first and second carbon additives may include one or more substances from the following group: benzene naphthalene phenanthrene copolymer, benzene phenanthrene binary copolymer, benzene anthracene binary copolymer, poly benzene, soluble starch, polyvinyl alcohol, polypropylene, polypropylene amide, sucrose, glucose, urea, phenolic resin, furfural resin, urea-formaldehyde resin, epoxy resin, artificial graphite, natural graphite, superconducting acetylene black, acetylene black, fumed silicon, and various types of carbon black. The lithium compound may contain one or more substances from the following group: $Li_2CO_3$, $LiOH$, $Li_2C_2O_4$, $CH_3COOLi$, $LiH_2PO_4$ and $Li_3PO_4$. The phosphorous compound may include one or more of the following compounds: $NH_4H_2PO_4$, $(NH_4)_2HPO_4$, $Li_3PO_4$ and $(NH_4)_3PO_4$. In some embodiments, the lithium, iron and phosphorous compounds provide Li:Fe:P molar ratios of about 0.9-1.2:1:1.

In a sixth embodiment, the iron compound in the composition of materials for making cathodes of lithium secondary batteries includes one or more trivalent iron compound selected from the group: $Fe_2O_3$, $FePO_4$, $Fe(NO_3)_3$ and $Fe_3O_4$. In one embodiment, the first carbon additive provides the cathode material with carbon content of about 5-10 grams for every mole of trivalent iron compound. In other embodiments, the material includes at least one metal compound, the metal compound being oxides, hydroxides and carbonates of Mg, Mn, Ca, Sn, Co, Ni, Cr, Zr and Mo. The lithium, metal, iron and phosphorous compounds are able to provide Li:M:Fe:P molar ratios of about 0.9-1.2:0.01-0.05:0.95-0.99:1.

In a seventh embodiment of the present invention, the iron compound in the composition of materials for making cathodes of lithium secondary batteries includes one or more divalent iron compound selected from the group: $Fe_2C_2O_4$, $Fe(CH_3COO)_2$, $FeCl_2$, $FeSO_4$ and $Fe_3(PO_4)_2$.

Other variations, embodiments and features of the present invention will become evident from the following detailed description, drawings and claims.

DETAILED DESCRIPTION

Figure 1:
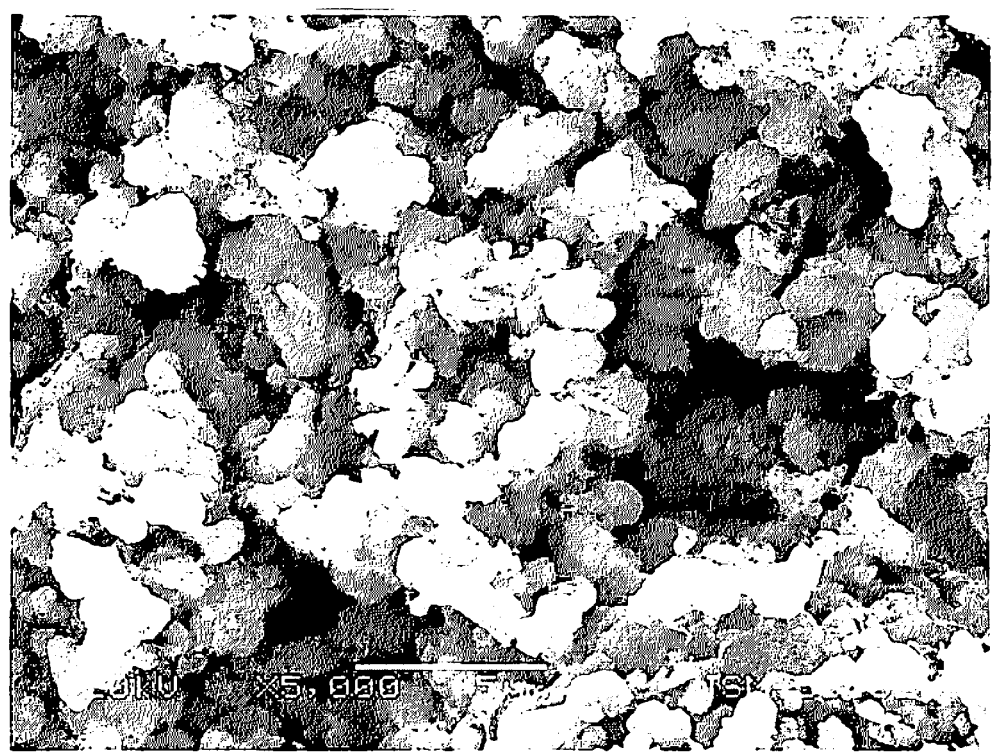
FIG. 1 illustrates a scanning electron microscope (SEM) image of a lithium iron phosphate cathode material according to one example of the presently disclosed invention.

It will be appreciated by those of ordinary skill in the art that the invention can be embodied in other specific forms without departing from the spirit or essential character thereof. The presently disclosed embodiments are therefore considered in all respects to be illustrative and not restrictive.

The present invention provides a new method for preparing the cathode material for lithium secondary batteries, as well as new composition of materials used in the new method. The invention utilizes two carbon processes in a way to significantly improve the electrical property of the cathode material. The first carbon process provides a reductant environment to ensure the conversion of trivalent iron to divalent iron, or in the case where divalent iron compound is used, to prevent divalent iron from oxidation. The carbon additives in the first carbon process may be evenly distributed among the chemical precursors of lithium iron phosphate before the heating. This characteristic results in the maximal reducing effect of the first carbon process and the carbon formation in the spaces between lithium iron phosphate crystals. During the second carbon process, the carbon particles between lithium iron phosphate crystals tend to coat the surface of the lithium iron phosphate crystals formed during the second carbon process, which is referred to as "carbon coating." The carbon coating, other than providing a layer of conductive material, helps limit the size of the lithium iron phosphate crystals and promotes the desired homogeneity of the crystal size. Further, where a trivalent iron compound is used as a starting material, the second carbon process also ensures the reduction of residual trivalent iron left over from the first carbon process to divalent iron to minimize impurity contents in the cathode material.

The cathode material that the present invention produces exhibits superior particle homogeneity and high electrical capacity especially during high electrical discharges. Such cathode materials are better suited for applications including without limitations electrical vehicles and notebook computers.

The general procedure of invention calls for a first carbon process where a lithium compound, an iron compound, a phosphorous compound, and a first carbon additive are mixed and heated to a first temperature. After the first carbon process, the material is cooled to the room temperature and a second carbon process is performed where a second carbon additive is added to the product of the first carbon process and the mixture is heated to a second temperature.

The carbon additives that can be incorporated in the presently disclosed embodiments include benzene naphthalene phenanthrene copolymer, benzene phenanthrene binary copolymer, benzene anthracene binary copolymer, poly benzene, soluble starch, polyvinyl alcohol, polypropylene, polypropylene amide, sucrose, glucose, urea, phenolic resin, furfural resin, urea-formaldehyde resin, epoxy resin, artificial graphite, natural graphite, superconducting acetylene black, acetylene black, fumed silicon, and various types of carbon black. It will be appreciated by one skilled in the art that the carbon additives can include other carbon-containing materials.

Because small organic molecules can be more evenly dispersed throughout milled particles, the resulting carbon particles from the organic solvents can be better distributed throughout the mixture during a sintering processes. Accordingly, small organic molecules including glucose, sucrose and urea may be used as the first carbon additive, while polymers including polyvinyl alcohol, polypropylene, polypropylene amide, polyethylene glycol, phenol-formaldehyde resin, urea-formaldehyde resin and epoxy resin may be best suited to be the second carbon additive.

The lithium compound may include $Li_2CO_3$, $LiOH$, $Li_2C_2O_4$, $CH_3COOLi$, $LiH_2PO_4$, $Li_3PO_4$ and other lithium-containing compounds known in the art. The phosphorous compound may include $NH_4H_2PO_4$, $(NH_4)_2HPO_4$, $Li_3PO_4$, $(NH_4)_3PO_4$ and other phosphorous-containing compounds known in the art. A mixture can include one or more of the lithium, iron and phosphorous compounds described above.

The iron compound may be a divalent iron compound such as $Fe_2C_2O_4$, $Fe(CH_3COO)_2$, $FeCl_2$, $FeSO_4$ and $Fe_3(PO_4)_2$ or any combination thereof. The iron compound can also be a trivalent iron compound such as $Fe_2O_3$, $FePO_4$, $Fe(NO_3)_3$ and $Fe_3O_4$ or any combination thereof. It will be appreciated by one skilled in the art that mixed-valence iron-containing compounds may also be utilized.

In one instance, if a trivalent iron compound is utilized, the first carbon additive can be added in a way to provide 5 to 10 grams of carbon for every one mole of the trivalent iron. The first and second carbon additives can be added in a way to provide about 1 to 15% by weight of carbon content in the final product. The first temperature in the first carbon process can be about 500 to 700° C., and the first temperature can be maintained at a constant level for 5 to 20 hours. The second temperature in the second carbon process can be about 700 to 900° C., and the second temperature can be maintained at a constant level also for 5 to 20 hours.

In another instance, when a divalent iron compound is utilized, the carbon additives are added to provide 1-15% by weight of carbon content in the final $LiFePO_4$ product. Additionally, the weight ratio of the amount of carbon additive consumed during the first carbon process versus the amount of carbon additive consumed during the second carbon process is about 2-10 to 1. The first temperature in the first carbon process can be about 300 to 500° C., and the first temperature can be maintained at a constant level for 5 to 15 hours. The second temperature in the second carbon process can be about 600 to 800° C., and the second temperature can be maintained at a constant level also for 5 to 20 hours. The second temperature may be higher than the first temperature by at least 80° C. in many instances. In other instances, the second temperature may be higher than the first temperature by at least 100° C. In other instances, the second temperature need not be higher than the first temperature.

During the first carbon process, the amount of carbon additive may be important to the performance of the resulting $LiFePO_4$ cathode material. When the amount of carbon doping is too low, there may be minimal improvement in electrical conductivity. When the amount of carbon doping is too high, the electrical conductivity may improve, but it may lead to excessive carbon particles during the second carbon process thereby lowering the density of the resulting cathode material. This can be especially true if a trivalent iron compound is utilized wherein optimal amounts of carbon additives can be included to maximize the reduction properties of the trivalent iron compound while maintaining the appropriate cathode density. The amount of first carbon additive may ensure that it will not become completely depleted during the first carbon process and that reduction of the trivalent iron compound (or maintaining the reduced state of the divalent iron) will continue to take place during the second carbon process. Accordingly, if a trivalent iron compound is incorporated, the amount of carbon additive utilized may provide a carbon content of about 6 to 8 grams for the resulting $LiFePO_4$ cathode material. In other embodiments, the total weight of the carbon additive may be able to provide the $LiFePO_4$ cathode material with a carbon content of about 1-15% by weight.

Prior to the first carbon process, the mixture of lithium, iron, phosphorous compounds and carbon additive can be grinded or milled by known techniques. In one embodiment, the mixture can be grounded in a ball mill. In other embodiments, the mixture can be grounded or milled with a vibrating or pulverizing mill. The mixture can also be grounded or milled by other mixing apparatus along with the use of organic solvents. In some instances, the weight ratio of ethanol, alcohol, acetone or other organic solvents relative to the mixture is about 1-5 to 1. No specific limitations on the rotational speed of the ball mill or the milling time are necessary. In other words, various rotational speed and time may be used to grind or mill the mixture as desired to provide a uniform mixture. Additionally, various temperatures and conditions for removing and drying the mixture may be utilized.

Prior to the second carbon process but after the first carbon process, the residual or un-reacted carbon additive may be grinded or milled again to provide a more uniform mixture. The grinding or milling process can include hand milling, hand crushing or the processes described above. In one embodiment, the mixture can be subjected to a ball mill at a rate of between 100 to 300 revolutions per minute for 30 to 100 minutes. In other instances, the milling rate is between 150 to 400 revolutions per minute for 1 to 8 hours. In other embodiments, different milling rate and time may be incorporated. The mixture can also be grounded or milled using organic solvents and other mixing apparatus. The weight ratio of ethanol, alcohol, acetone or other organic solvents relative to the mixture of lithium, iron, phosphorous compounds and carbon additive is about 1-5 to 1. In other embodiments, instead of grinding or milling the remaining or residual carbon additive, different carbon additives may be incorporated in the mixture. And like above, various temperatures and conditions of removing and drying the mixture may be utilized.

To further facilitate and optimize the role of the carbon additive in the mixture of lithium, iron and phosphorous compounds, it may be necessary to increase to the first sintering temperature at an incremental rate of 1-5° C./min, maintain and hold at the first sintering temperature for a predetermined amount of time, and then allow ambient cooling of the mixture back to room temperature. The residual carbon additive may be sintered by raising the temperature up to the second sintering temperature at a rate of 2-10° C./min, maintain and hold at the second sintering temperature for a predetermined amount of time, and then allow ambient cooling to room temperature. In other embodiments, the incremental rate can range from about 1 to 10° C./min.

Most organic molecules can be pyrolyzed or decomposed at 350° C., but there's no guarantee that the mixture will achieve complete decomposition. Therefore, the first sintering temperature can be high enough to ensure sufficient decomposition of the carbon additive and to facilitate the reaction of any remaining or additional carbon additives during the second sintering step. In one embodiment, the first sintering temperature can range from about 300 to 500° C. for 5-15 hours while the second sintering temperature can range from about 600 to 800° C. for 5-20 hours. In other embodiments, the first sintering temperature can range from about 500 to 700° C. for 5-10 hours while the second sintering temperature can range from about 700 to 900° C. for 5-20 hours. In other instances, the first sintering temperature can range from 550-650° C. for 6-15 hours while the second sintering temperature can range from 725-800° C. for 6-15 hours.

In other embodiments, one or more metal-containing compounds may be added to the lithium, iron, phosphorous and carbon additive mixture, wherein metal ions may be distributed throughout the cathode material during the sintering processes. Additional grinding or milling of the mixture can further facilitate in evenly distributing the metal ions from the metal-containing compound to provide a homogeneous cathode material. Furthermore, the two-step heat treatment can provide further penetration of the metal ions from the metal compound throughout the crystal structure of the $LiFePO_4$ cathode material thereby enhancing the electrical conductivity of the material.

The metal-containing compound may include oxides, hydroxides and carbonates of Mg, Mn, Ca, Sn, Co, Ni, Cr, Zr and Mo. For example, magnesium oxide, manganese dioxide, calcium carbonate, tin oxide, cobalt oxide, nickel oxide, chromium oxide, zirconium oxide and molybdenum oxide, to name a few. It will be appreciated by one skilled in the art that other metal-containing compounds known in the art may be incorporated. In these embodiments, the lithium, metal, iron and phosphorous compounds are able to provide Li:M:Fe:P molar ratios of 0.9-1.2:0.01-0.05:0.95-0.99:1. And like above, the metal-containing compound can be mechanically mixed, hand ground or milled or grounded using similar techniques as described above to provide an even mixture. Also, organic solvents may be utilized to facilitate in providing a uniform mixture.

To minimize the amount of oxidation to iron salts, the sintering processes may be carried out in an inert atmosphere with gases or gas mixtures that will not trigger a chemical reaction with the mixture. For example, inert gases including helium, neon, argon, krypton and xenon may be utilized. In other instances, hydrogen, nitrogen, carbon monoxide, ammonia and other gas mixtures may be incorporated. The inert atmosphere can be static with gas flow rate of between 2-50 L/min. In addition, air or mortar pulverization may be utilized to provide powder form of the $LiFePO_4$ cathode material. In other embodiments, the sintering processes can be conducted in-situ.

The present invention provides new method and composition of materials for preparation of cathodes in rechargeable, lithium secondary batteries. It will be appreciated by one skilled in the art that the anode for use with the cathode material of the invention may be any lithium anode material including a reductant host for lithium or elemental lithium itself.

The heat treatment at the first temperature is such that a portion of the carbon additive may be consumed by the mixture while residues or unconsumed portions of the carbon additive remain. The mixture can then be subjected to a second temperature heat treatment to exhaust the remainder of the carbon additive. The heat treatments can include sintering or heating without melting, calcinations and pyrolysis. It is understood that other heating processes may be utilized.

In other embodiments, the phosphorous-containing compound may not be necessary if either the lithium or iron compound incorporates a phosphate group. In addition, the mixture may contain more than one lithium, iron, phosphorous compound or carbon additive. For example, the lithium iron phosphate ($LiFePO_4$) cathode material may be made from two lithium-containing compounds, one iron compound and three phosphorous compounds. Additionally, more than one carbon additive may be introduced during either carbon process.

The following are various embodiments of the lithium iron phosphate ($LiFePO_4$) composite cathode material according to the presently disclosed invention.

EXAMPLE A1

(1) Mix 0.1 mole $Li_2CO_3$, 0.2 mole $FeC_2O_4 \cdot 2H_2O$, 0.2 mole $NH_4H_2PO_4$, glucose and 250 mL ethanol to provide Li:Fe:P molar ratio of 1:1:1, grind the mixture in a ball mill for 12 hours at 300 revolutions per minute, remove and dry at 70° C.;

(2) In an argon flow rate of 10 L/min, heat the mixture of (1), at a rate of 2° C./min, up to 450° C. for 6 hours, allow ambient cooling to room temperature, add sucrose and 100 mL ethanol, grind the mixture in a ball mill for 1 hour at 150 revolutions per minute, remove and dry at 70° C. (the weight ratio of glucose in (1) and sucrose in (2) can be about 2.5 to 1); and (3) In an argon flow rate of 10 L/min, heat the mixture of (2), at a rate of 10° C./min, up to 700° C. for 10 hours, allow ambient cooling to room temperature, air pulverize to provide a carbon-doped $LiFePO_4$ composite powder, wherein the combined carbon additives provide the $LiFePO_4$ composite powder with a carbon content of about 3% by weight.

The carbon-doped $LiFePO_4$ composite powder is subjected to a 200 sieve mesh with resulting particle size distribution D50 at 2.2 micron, D95 at 6.5 micron, and tap density of 1.10 g/mL.

Figure 2:
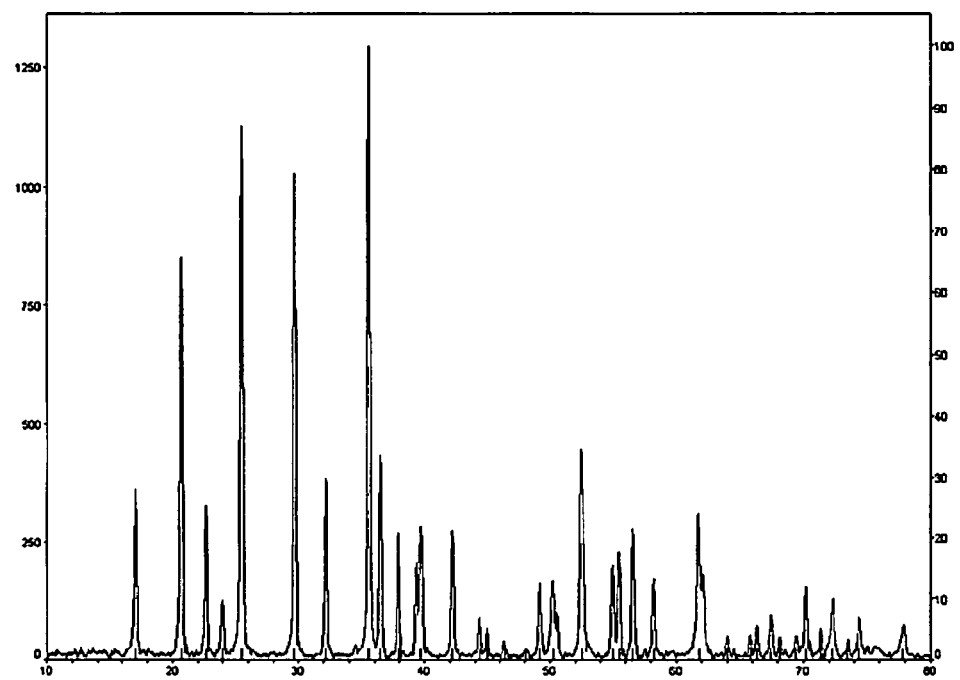
FIG. 2 illustrates an x-ray diffraction (XRD) pattern of the lithium iron phosphate cathode material of FIG. 1.

A scanning electron microscope (SEM) image of the carbon-doped $LiFePO_4$ composite powder was performed on a Shimadzu SSX-550 as shown in FIG. 1, while an x-ray diffraction (XRD) pattern was carried out with a Rigaku D/MAX-2200 as shown in FIG. 2.

EXAMPLE A2

(1) Mix 0.1 mole $Li_2CO_3$, 0.2 mole $FeC_2O_4 \cdot 2H_2O$, 0.2 mole $NH_4H_2PO_4$, glucose and 250 mL ethanol to provide Li:Fe:P molar ratio of 1:1:1, grind the mixture in a ball mill for 12 hours at 300 revolutions per minute, remove and dry at 70° C.;

(2) In an argon flow rate of 10 L/min, heat the mixture of (1), at a rate of 2° C./min, up to 450° C. for 6 hours, allow ambient cooling to room temperature, add sucrose and mix uniformly; and (3) In an argon flow rate of 10 L/min, heat the mixture of (2), at a rate of 10° C./min, up to 700° C. for 10 hours, allow ambient cooling to room temperature, air pulverize to provide a carbon-doped $LiFePO_4$ composite powder, wherein the combined carbon additives provide the $LiFePO_4$ composite powder with a carbon content of about 3% by weight.

The carbon-doped $LiFePO_4$ composite powder is subjected to a 200 sieve mesh with resulting particle size distribution D50 at 2.5 micron, D95 at 6.5 micron, and tap density of 1.10 g/mL.

EXAMPLE A3

(1) Mix 0.21 mole LiOH, 0.2 mole $FeC_2O_4 \cdot 2H_2O$, 0.2 mole $(NH_4)_2HPO_4$, sucrose and 250 mL ethanol to provide Li:Fe:P molar ratio of 1:1:1, grind the mixture in a ball mill for 12 hours at 300 revolutions per minute, remove and dry at 70° C.;

(2) In an argon flow rate of 10 L/min, heat the mixture of (1), at a rate of 2° C./min, up to 450° C. for 6 hours, allow ambient cooling to room temperature, add polypropylene amide and 100 mL ethanol, grind the mixture in a ball mill for 30 minutes at 200 revolutions per minute, remove and dry at 70° C. (the weight ratio of sucrose in (1) and polypropylene amide in (2) can be about 3.2 to 1); and (3) In an argon flow rate of 10 L/min, heat the mixture of (2), at a rate of 10° C./min, up to 700° C. for 12 hours, allow ambient cooling to room temperature, air pulverize to provide a carbon-doped $LiFePO_4$ composite powder, wherein the combined carbon additives provide the $LiFePO_4$ composite powder with a carbon content of about 5% by weight.

The carbon-doped $LiFePO_4$ composite powder is subjected to a 200 sieve mesh with resulting particle size distribution D50 at 2.5 micron, D95 at 6.8 micron, and tap density of 1.23 g/mL.

EXAMPLE A4

(1) Mix 0.21 mole LiOH, 0.2 mole $FeC_2O_4 \cdot 2H_2O$, 0.2 mole $(NH_4)_2HPO_4$, sucrose and 250 mL ethanol to provide Li:Fe:P molar ratio of 1:1:1, grind the mixture in a ball mill for 12 hours at 300 revolutions per minute, remove and dry at 70° C.;

(2) In an argon flow rate of 10 L/min, heat the mixture of (1), at a rate of 2° C./min, up to 450° C. for 6 hours, allow ambient cooling to room temperature, add polypropylene amide and mix uniformly; and (3) In an argon flow rate of 10 L/min, heat the mixture of (2), at a rate of 10° C./min, up to 700° C. for 12 hours, allow ambient cooling to room temperature, air pulverize to provide a carbon-doped $LiFePO_4$ composite powder, wherein the combined carbon additives provide the $LiFePO_4$ composite powder with a carbon content of about 5% by weight.

The carbon-doped $LiFePO_4$ composite powder is subjected to a 200 sieve mesh with resulting particle size distribution D50 at 2.6 micron, D95 at 7.1 micron, and tap density of 1.14 g/mL.

EXAMPLE A5

(1) Mix 0.102 mole $Li_2CO_3$, 0.2 mole $Fe(CH_3COO)_2$, 0.2 mole $(NH_4)_3PO_4$, urea and 250 mL ethanol to provide Li:Fe:P molar ratio of 1:1:1, grind the mixture in a ball mill for 12 hours at 300 revolutions per minute, remove and dry at 70° C.;

(2) In an argon flow rate of 10 L/min, heat the mixture of (1), at a rate of 2° C./min, up to 450° C. for 6 hours, allow ambient cooling to room temperature, add polyvinyl alcohol and 100 mL ethanol, grind the mixture in a ball mill for 1 hour at 180 revolutions per minute, remove and dry at 70° C. (the weight ratio of urea in (1) and polyvinyl alcohol in (2) can be about 4.8 to 1); and (3) In an argon flow rate of 10 L/min, heat the mixture of (2), at a rate of 10° C./min, up to 700° C. for 10 hours, allow ambient cooling to room temperature, air pulverize to provide a carbon-doped $LiFePO_4$ composite powder, wherein the combined carbon additives provide the $LiFePO_4$ composite powder with a carbon content of about 4.5% by weight.

The carbon-doped $LiFePO_4$ composite powder is subjected to a 200 sieve mesh with resulting particle size distribution D50 at 2.7 micron, D95 at 8.0 micron, and tap density of 1.10 g/mL.

EXAMPLE A6

(1) Mix 0.2 mole $LiH_2PO_4$, 0.2 mole $FeC_2O_4 \cdot 2H_2O$, glucose and 200 mL ethanol to provide Li:Fe:P molar ratio of 1:1:1, grind the mixture in a ball mill for 12 hours at 350 revolutions per minute, remove and dry at 70° C.;

(2) In an argon flow rate of 10 L/min, heat the mixture of (1), at a rate of 2° C./min, up to 450° C. for 6 hours, allow ambient cooling to room temperature, add polypropylene and 100 mL ethanol, grind the mixture in a ball mill for 1 hour at 200 revolutions per minute, remove and dry at 70° C. (the weight ratio of glucose in (1) and polypropylene in (2) can be about 2.2 to 1); and (3) In an argon flow rate of 10 L/min, heat the mixture of (2), at a rate of 10° C./min, up to 700° C. for 10 hours, allow ambient cooling to room temperature, air pulverize to provide a carbon-doped $LiFePO_4$ composite powder, wherein the combined carbon additives provide the $LiFePO_4$ composite powder with a carbon content of about 8% by weight.

The carbon-doped $LiFePO_4$ composite powder is subjected to a 200 sieve mesh with resulting particle size distribution D50 at 2.5 micron, D95 at 7.0 micron, and tap density of 1.18 g/mL.

EXAMPLE A7

(1) Mix 0.2 mole $CH_3COOLi$, 0.2 mole $FeC_2O_4 \cdot 2H_2O$, 0.2 mole $NH_4H_2PO_4$, glucose and 250 mL acetone to provide Li:Fe:P molar ratio of 1:1:1, grind the mixture in a ball mill for 10 hours at 350 revolutions per minute, remove and dry at 70° C.;

(2) In an argon flow rate of 10 L/min, heat the mixture of (1), at a rate of 2° C./min, up to 450° C. for 6 hours, allow ambient cooling to room temperature, add urea-formaldehyde resin and 100 mL ethanol, grind the mixture in a ball mill for 1 hour at 180 revolutions per minute, remove and dry at 70° C. (the weight ratio of glucose in (1) and urea-formaldehyde resin in (2) can be about 2.3 to 1); and (3) In an argon flow rate of 10 L/min, heat the mixture of (2), at a rate of 10° C./min, up to 700° C. for 15 hours, allow ambient cooling to room temperature, air pulverize to provide a carbon-doped $LiFePO_4$ composite powder, wherein the combined carbon additives provide the $LiFePO_4$ composite powder with a carbon content of about 6% by weight.

The carbon-doped $LiFePO_4$ composite powder is subjected to a 200 sieve mesh with resulting particle size distribution D50 at 2.6 micron, D95 at 8.0 micron, and tap density of 1.08 g/mL.

EXAMPLE A8

(1) Mix 0.1 mole $Li_2C_2O_4$, 0.2 mole $FeC_2O_4 \cdot 2H_2O$, 0.2 mole $NH_4H_2PO_4$, glucose and 200 mL acetone to provide Li:Fe:P molar ratio of 1:1:1, grind the mixture in a ball mill for 12 hours at 300 revolutions per minute, remove and dry at 70° C.;

(2) In an argon flow rate of 10 L/min, heat the mixture of (1), at a rate of 2° C./min, up to 450° C. for 6 hours, allow ambient cooling to room temperature, add epoxy resin and 100 mL acetone, grind the mixture in a ball mill for 1 hour at 180 revolutions per minute, remove and dry at 70° C. (the weight ratio of glucose in (1) and epoxy resin in (2) can be about 3 to 1); and (3) In an argon flow rate of 10 L/min, heat the mixture of (2), at a rate of 10° C./min, up to 700° C. for 10 hours, allow ambient cooling to room temperature, air pulverize to provide a carbon-doped $LiFePO_4$ composite powder, wherein the combined carbon additives provide the $LiFePO_4$ composite powder with a carbon content of about 4% by weight.

The carbon-doped $LiFePO_4$ composite powder is subjected to a 200 sieve mesh with resulting particle size distribution D50 at 2.5 micron, D95 at 7.1 micron, and tap density of 1.18 g/mL.

The following are various references of lithium iron phosphate ($LiFePO_4$) composite cathode material for comparison purposes.

REFERENCE A9

(1) Mix 0.1 mole $Li_2CO_3$, 0.2 mole $FeC_2O_4 \cdot 2H_2O$, 0.2 mole $NH_4H_2PO_4$, glucose and 250 mL ethanol to provide Li:Fe:P molar ratio of 1:1:1, grind the mixture in a ball mill for 12 hours at 300 revolutions per minute, remove and dry at 70° C.;

(2) In an argon flow rate of 10 L/min, heat the mixture of (1), at a rate of 2° C./min, up to 450° C. for 6 hours, allow ambient cooling to room temperature, add 150 mL ethanol, grind the mixture in a ball mill for 1 hour at 200 revolutions per minute, remove and dry at 70° C.; and (3) In an argon flow rate of 10 L/min, heat the mixture of (2), at a rate of 10° C./min, up to 700° C. for 10 hours, allow ambient cooling to room temperature, air pulverize to provide a carbon-doped $LiFePO_4$ composite powder, wherein the glucose provides the $LiFePO_4$ composite powder with a carbon content of about 3% by weight.

The carbon-doped $LiFePO_4$ composite powder is subjected to a 200 sieve mesh with resulting particle size distribution D50 at 2.5 micron, D95 at 7.0 micron, and tap density of 0.68 g/mL.

REFERENCE A10

(1) Mix 0.1 mole $Li_2CO_3$, 0.2 mole $FeC_2O_4 \cdot 2H_2O$, 0.2 mole $NH_4H_2PO_4$, and 200 mL ethanol to provide Li:Fe:P molar ratio of 1:1:1, grind the mixture in a ball mill for 12 hours at 300 revolutions per minute, remove and dry at 70° C.;

(2) In an argon flow rate of 10 L/min, heat the mixture of (1), at a rate of 2° C./min, up to 450° C. for 6 hours, allow ambient cooling to room temperature, add polypropylene amide and 100 mL ethanol, grind the mixture in a ball mill for 1 hour at 200 revolutions per minute, remove and dry at 70° C.; and (3) In an argon flow rate of 10 L/min, heat the mixture of (2), at a rate of 10° C./min, up to 700° C. for 10 hours, allow ambient cooling to room temperature, air pulverize to provide a carbon-doped $LiFePO_4$ composite powder, wherein the polypropylene amide provides the $LiFePO_4$ composite powder with a carbon content of about 3% by weight.

The carbon-doped $LiFePO_4$ composite powder is subjected to a 200 sieve mesh with resulting particle size distribution D50 at 4.2 micron, D95 at 9.8 micron, and tap density of 1.25 g/mL.

REFERENCE A11

(1) Mix proportional amounts of lithium, iron and phosphate salts to provide Li:Fe:P molar ratio of about 0.97-1.20:1:1;

(2) Grind or mill the mixture between 1-2 hours and introduce appropriate amounts of alcohol as necessary;

(3) Place the mixture into a furnace having an inert gas flow rate of between 0.01-50 L/min, preferably 2-10 L/min, preheat the mixture at between 100-500° C. for 1-30 hours (at increments of 1-20° C./min);

(4) After the mixture has ambient cooled to room temperature, add alcohol and carbon black (between 1-10% by weight) and repeat the grinding or milling process;

(5) Place the mixture into the furnace for high-temperature treatment at between 500-900° C. for 10-48 hours; and (6) Allow ambient cooling to room temperature.

TESTING OF EXAMPLES A1-A8 AND REFERENCES A9-A11

(1) Battery Preparation (a) Cathode Active Material

Separately combine 80 grams of each of the lithium iron phosphate (LiFePO$_4$) composite material from examples A1-A8 and references A9-A11 with 10 grams of polyvinylidene fluoride (PVDF) binder and 10 grams of acetylene black to 50 grams of N-methylpyrrolidone (NMP), mix in a vacuum mixer into a uniform slurry, apply a coating of about 20 microns thick to each side of an aluminum foil, dry at 150° C., roll and crop to a size of 540×43.5 mm$^2$ to provide about 2.8 grams of LiFePO$_4$ as the active ingredient.

(b) Anode Active Material

Combine 100 grams of natural graphite with 5 grams of conductive acetylene black and 5 grams of polyvinylidene fluoride (PVDF) binder to 100 grams of N-methylpyrrolidone (NMP), mix in a vacuum mixer into a uniform slurry, apply a coating of about 12 microns thick to each side of a copper foil, dry at 90° C., roll and crop to a size of 500×44 mm$^2$ to provide about 2.6 grams of natural graphite as the active ingredient.

(c) Battery Assembly

Separately wind each of the cathode and anode active materials with polypropylene film into a lithium secondary battery core, followed by dissolving 1M LiPF$_6$ in a mixture of non-aqueous electrolyte solvent EC/EMC/DEC to provide a ratio of 1:1:1, inject and seal the electrolyte having a capacity of 3.8 g/Ah into the battery to provide separate lithium secondary batteries for the testing of examples A1-A8 and references A9-A11.

(2) Testing Cycle (a) Performance Test

Place each of the lithium secondary batteries A1-A11 on a test cabinet. Using a constant current charge of 0.1 C with an upper limit of 3.8 volts, charge each battery for 2.5 hours at constant voltage and set aside for 20 minutes. Using a current of 0.1 C discharge from 3.8 volts to 3.0 volts, record the battery discharge capacity, and then repeat the above steps 50 times. After the battery has been subjected to the 50 cycles of charge/discharge, record the before and after battery discharge capacity to calculate the rate of discharge capacity with the following equation:

Rate of discharge capacity=(Discharge capacity at 50$^{th}$ cycle/Initial discharge capacity)×100%

(b) Large Current Discharge Performance Test

Using a constant current charge of 0.1 C with an upper limit of 3.8 volts, charge each battery for 2.5 hours at constant voltage and set aside for 20 minutes. Separate use currents of 1 C, 2 C and 5 C with discharges from 3.8 volts to 3.0 volts, record the battery discharge capacity relative to the discharge capacity with 0.1 C to provide discharge capacity ratios, namely:

$C_{1C}/C_{0.1C}$: Current discharge capacity of 1 C from 3.8 volts to 3.0 volts relative to current discharge capacity of 0.1 C from 3.8 volts to 3.0 volts;

$C_{2C}/C_{0.1C}$: Current discharge capacity of 2 C from 3.8 volts to 3.0 volts relative to current discharge capacity of 0.1 C from 3.8 volts to 3.0 volts; and $C_{5C}/C_{0.1C}$: Current discharge capacity of 5 C from 3.8 volts to 3.0 volts relative to current discharge capacity of 0.1 C from 3.8 volts to 3.0 volts.

The testing cycle results for examples A1-A11 are shown in Table 1.

TABLE 1

Test results of LiFePO$_4$ composite cathode materials and reference samples.

| Sample number | Initial discharge capacity (mAh/g) | Recycling capacity after 50 cycles (%) | Discharge performance | | |
|---|---|---|---|---|---|
| | | | $C_{1C}/C_{0.1C}$ (%) | $C_{2C}/C_{0.1C}$ (%) | $C_{5C}/C_{0.1C}$ (%) |
| A1 | 152 | 99 | 98 | 96 | 91 |
| A2 | 150 | 98 | 97 | 95 | 91 |
| A3 | 149 | 99 | 99 | 96 | 92 |
| A4 | 147 | 98 | 97 | 95 | 91 |
| A5 | 147 | 98 | 98 | 95 | 92 |
| A6 | 146 | 99 | 99 | 97 | 92 |
| A7 | 147 | 98 | 98 | 96 | 92 |
| A8 | 146 | 99 | 98 | 95 | 92 |
| A9 | 140 | 94 | 96 | 92 | 90 |
| A10 | 126 | 91 | 92 | 85 | 70 |
| A11 | 141 | 92 | 91 | 83 | 67 |

Reference is now made to FIG. 1 illustrating a scanning electron microscope (SEM) image at 5000× magnification of a lithium iron phosphate cathode material according to example A1 of the presently disclosed invention. From the figure, it can be observed that the crystals of the LiFePO$_4$ composite cathode material are relatively uniform with uniform particle size distribution with majority of particles having diameters ranging between 1 to 3 microns.

Reference is now made to FIG. 2 illustrating an x-ray diffraction (XRD) pattern of the lithium iron phosphate cathode material according to example A1 of the presently disclosed invention having olivine-type crystal structure and good crystal growth and development.

From the data in Table 1, it can be observed that the LiFePO$_4$ composite cathode materials according to examples A1-A8 of the presently disclosed invention provide higher initial discharge capacity than references A9-A11. In addition, examples A1-A8 are able to maintain greater than 98% discharge capacity after 50 cycles. More importantly, the large current discharge performance of A1-A8 maintained, on average, greater than 98%, 95% and 91% at 1 C, 2 C, and 5 C discharge currents, respectively. Accordingly, the lithium iron phosphate cathode materials for lithium secondary batteries and methods of manufacturing such according to the presently disclosed invention provide superior performance relative to the reference samples and other similar lithium iron phosphate cathode materials currently on the market.

The following are various embodiments of the lithium iron phosphate (LiFePO$_4$) composite cathode material having trivalent iron compound according to the presently disclosed invention.

EXAMPLE B1

(1) Mix 0.1 mole Li$_2$CO$_3$, 0.2 mole FePO$_4$, 1.2 grams of carbon black and 250 mL ethanol to provide Li:Fe:P molar ratio of 1:1:1, grind the mixture in a ball mill for 8 hours at 300 revolutions per minute, remove and dry at 70° C.;

(2) In an argon flow rate of 10 L/min, heat the mixture of (1), at a rate of 5° C./min, up to 650° C. for 6 hours, allow ambient cooling to room temperature, add 2.6 grams of glucose and 150 mL ethanol, grind the mixture in a ball mill for 6 hour at 250 revolutions per minute, remove and dry at 70° C.; and (3) In an argon flow rate of 10 L/min, heat the mixture of (2), at a rate of 10° C./min, up to 750° C. for 10 hours, allow ambient cooling to room temperature, air pulverize to provide a carbon-doped $LiFePO_4$ composite powder, wherein the glucose in (2) provides the $LiFePO_4$ composite powder with a carbon content of about 3% by weight.

The carbon-doped $LiFePO_4$ composite powder is subjected to a 200 sieve mesh with resulting particle size distribution D50 at 2.9 micron and tap density of 1.45 g/mL.

Figure 3:
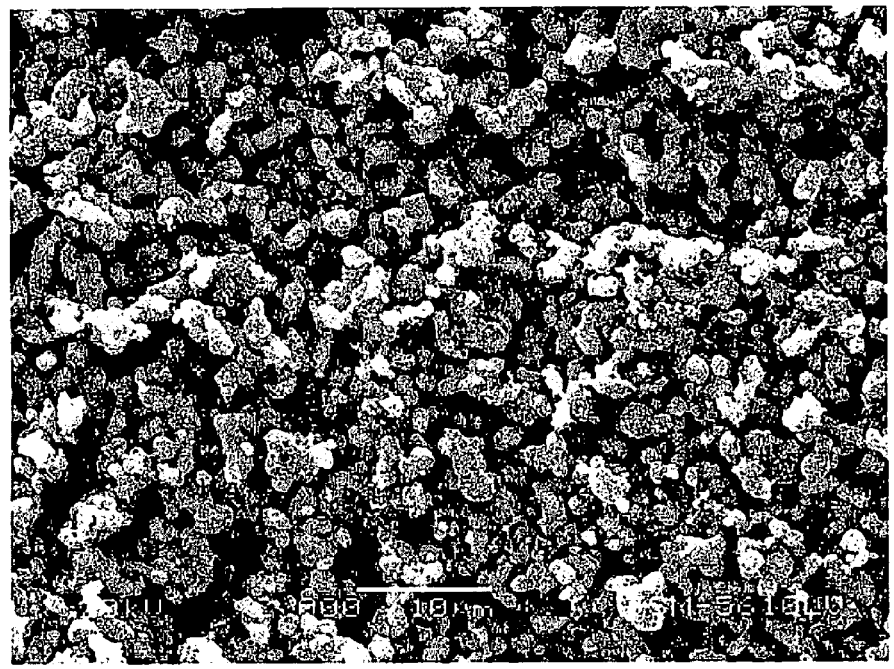
FIG. 3 illustrates a scanning electron microscope (SEM) image of a lithium iron phosphate cathode material according to another example of the presently disclosed invention.
Figure 4:
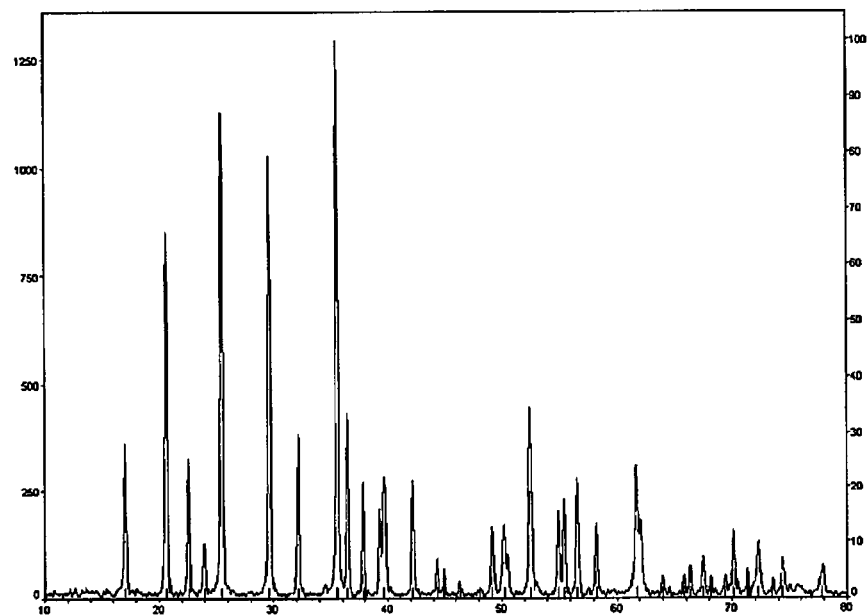
FIG. 4 illustrates an x-ray diffraction (XRD) pattern of the lithium iron phosphate cathode material of FIG. 3.

A scanning electron microscope (SEM) image of the carbon-doped $LiFePO_4$ composite powder was performed on a Shimadzu SSX-550 as shown in FIG. 3, while an x-ray diffraction (XRD) pattern was carried out with a Rigaku D/MAX-2200 as shown in FIG. 4.

EXAMPLE B2

(1) Mix 0.1 mole $Li_2CO_3$, 0.2 mole $FePO_4$, 1.2 grams of carbon black and 250 mL ethanol to provide Li:Fe:P molar ratio of 1:1:1, grind the mixture in a ball mill for 8 hours at 300 revolutions per minute, remove and dry at 70° C.;

(2) In an argon flow rate of 10 L/min, heat the mixture of (1), at a rate of 5° C./min, up to 650° C. for 6 hours, allow ambient cooling to room temperature, add 2.6 grams of glucose and mix uniformly; and (3) In an argon flow rate of 10 L/min, heat the mixture of (2), at a rate of 10° C./min, up to 750° C. for 10 hours, allow ambient cooling to room temperature, air pulverize to provide a carbon-doped $LiFePO_4$ composite powder, wherein the glucose in (2) provides the $LiFePO_4$ composite powder with a carbon content of about 3% by weight.

The carbon-doped $LiFePO_4$ composite powder is subjected to a 200 sieve mesh with resulting particle size distribution D50 at 3.1 micron and tap density of 1.40 g/mL.

EXAMPLE B3

(1) Mix 0.1 mole $Li_2CO_3$, 0.198 mole $FePO_4$, 0.002 mole $Mg(OH)_2$, 1.2 grams of carbon black and 200 mL ethanol to provide Li:Fe:Mg:P molar ratio of 1:0.99:0.01:1, grind the mixture in a ball mill for 12 hours at 300 revolutions per minute, remove and dry at 70° C.;

(2) In an argon flow rate of 10 L/min, heat the mixture of (1), at a rate of 8° C./min, up to 670° C. for 6 hours, allow ambient cooling to room temperature, add 3.2 grams of glucose and 200 mL ethanol, grind the mixture in a ball mill for 6 hours at 200 revolutions per minute, remove and dry at 70° C.; and (3) In an argon flow rate of 10 L/min, heat the mixture of (2), at a rate of 10° C./min, up to 750° C. for 10 hours, allow ambient cooling to room temperature, air pulverize to provide a carbon and magnesium doped $LiFePO_4$ composite powder, wherein the glucose in (2) provides the $LiFePO_4$ composite powder with a carbon content of about 4% by weight.

The carbon and magnesium doped $LiFePO_4$ composite powder is subjected to a 200 sieve mesh with resulting particle size distribution D50 at 2.2 micron and tap density of 1.48 g/mL.

EXAMPLE B4

(1) Mix 0.21 mole LiOH, 0.098 mole $Fe_2O_3$, 0.2 mole $(NH_4)_3PO_4$, 0.004 mole $ZrO_2$, 6 grams of urea and 200 mL ethanol to provide Li:Fe:Zr:P molar ratio of 1.05:0.98:0.02:1, grind the mixture in a ball mill for 8 hours at 300 revolutions per minute, remove and dry at 70° C.;

(2) In an argon flow rate of 10 L/min, heat the mixture of (1), at a rate of 5° C./min, up to 700° C. for 6 hours, allow ambient cooling to room temperature, add 1.9 grams of polypropylene amide and 200 mL ethanol, grind the mixture in a ball mill for 4 hours at 300 revolutions per minute, remove and dry at 70° C.; and (3) In an argon flow rate of 10 L/min, heat the mixture of (2), at a rate of 5° C./min, up to 850° C. for 8 hours, allow ambient cooling to room temperature, air pulverize to provide a carbon and zirconium doped $LiFePO_4$ composite powder, wherein the polypropylene amide in (2) provides the $LiFePO_4$ composite powder with a carbon content of about 3% by weight.

The carbon and zirconium doped $LiFePO_4$ composite powder is subjected to a 200 sieve mesh with resulting particle size distribution D50 at 2.1 micron and tap density of 1.52 g/mL.

EXAMPLE B5

(1) Mix 0.3 mole $CH_3COOLi$, 0.099 mole $Fe_3O_4$, 0.3 mole $NH_4H_2PO_4$, 0.003 mole $Cr(NO_3)_3$, 3 grams of sucrose and 200 mL ethanol to provide Li:Fe:Cr:P molar ratio of 1:0.99:0.01:1, grind the mixture in a ball mill for 12 hours at 300 revolutions per minute, remove and dry at 70° C.;

(2) In an argon flow rate of 10 L/min, heat the mixture of (1), at a rate of 7° C./min, up to 650° C. for 8 hours, allow ambient cooling to room temperature, add 7.5 grams of polyethylene glycol and 200 mL ethanol, grind the mixture in a ball mill for 4 hours at 250 revolutions per minute, remove and dry at 70° C.; and (3) In an argon flow rate of 10 L/min, heat the mixture of (2), at a rate of 10° C./min, up to 700° C. for 7 hours, allow ambient cooling to room temperature, air pulverize to provide a carbon and chromium doped $LiFePO_4$ composite powder, wherein the polyethylene glycol in (2) provides the $LiFePO_4$ composite powder with a carbon content of about 6.5% by weight.

The carbon and chromium doped $LiFePO_4$ composite powder is subjected to a 200 sieve mesh with resulting particle size distribution D50 at 2.3 micron and tap density of 1.38 g/mL.

EXAMPLE B6

(1) Mix 0.2 mole $LiH_2PO_4$, 0.096 mole $Fe_2O_3$, 0.008 mole $CaCO_3$, 2.8 grams of phenolic resin and 250 mL ethanol to provide Li:Fe:Ca:P molar ratio of 1:0.96:0.04:1, grind the mixture in a ball mill for 8 hours at 300 revolutions per minute, remove and dry at 70° C.;

(2) In an argon flow rate of 10 L/min, heat the mixture of (1), at a rate of 10° C./min, up to 700° C. for 6 hours, allow ambient cooling to room temperature, add 3.2 grams of epoxy resin and 200 mL ethanol, grind the mixture in a ball mill for 6 hours at 300 revolutions per minute, remove and dry at 70° C.; and (3) In an argon flow rate of 10 L/min, heat the mixture of (2), at a rate of 10° C./min, up to 800° C. for 12 hours, allow ambient cooling to room temperature, air pulverize to provide a carbon and calcium doped $LiFePO_4$ composite powder, wherein the epoxy resin in (2) provides the $LiFePO_4$ composite powder with a carbon content of about 3% by weight.

The carbon and calcium doped $LiFePO_4$ composite powder is subjected to a 200 sieve mesh with resulting particle size distribution D50 at 2.2 micron and tap density of 1.43 g/mL.

The following are various references of lithium iron phosphate (LiFePO$_4$) composite cathode material having trivalent iron compound for comparison purposes.

REFERENCE B7

(1) Mix 0.1 mole Li$_2$CO$_3$, 0.2 mole FePO$_4$, 10 grams of glucose and 250 mL ethanol to provide Li:Fe:P molar ratio of 1:1:1, grind the mixture in a ball mill for 8 hours at 300 revolutions per minute, remove and dry at 70° C.; and (2) In an argon flow rate of 10 L/min, heat the mixture of (1), at a rate of 10° C./min, up to 750° C. for 10 hours, allow ambient cooling to room temperature to provide a carbon-doped LiFePO$_4$ composite powder.

The carbon-doped LiFePO$_4$ composite powder is subjected to a 200 sieve mesh with resulting particle size distribution D50 at 3.5 micron and tap density of 1.56 g/mL.

REFERENCE B8

(1) Mix 0.1 mole Li$_2$CO$_3$, 0.98 mole Fe$_2$O$_3$, 0.2 mole NH$_4$H$_2$PO$_4$, 0.02 mole Mg(OH)$_2$, 20 grams of glucose and 250 mL ethanol to provide Li:Fe:Mg:P molar ratio of 1:0.98:0.02:1, grind the mixture in a ball mill for 10 hours at 300 revolutions per minute, remove and dry at 70° C.; and (2) In an argon flow rate of 10 L/min, heat the mixture of (1), at a rate of 10° C./min, up to 750° C. for 15 hours, allow ambient cooling to room temperature to provide a carbon and magnesium doped LiFePO$_4$ composite powder.

The carbon and magnesium doped LiFePO$_4$ composite powder is subjected to a 200 sieve mesh with resulting particle size distribution D50 at 3.1 micron and tap density of 1.45 g/mL.

REFERENCE B9

(1) Provide a mixture of lithium, trivalent iron and phosphate compounds with an organic solvent;

(2) Grind the mixture in a ball mill for between 1-8 hours and dry at 100-120° C.;

(3) Sinter the mixture at 500-800° C. for 4-24 hours; and (4) Allow ambient cooling to room temperature.

TESTING OF EXAMPLES B1-B6 AND REFERENCES B7-B9

(1) Battery Preparation (a) Cathode Active Material

Separately combine 80 grams of each of the lithium iron phosphate (LiFePO$_4$) composite material from examples B1-B6 and references B7-B9 with 10 grams of polyvinylidene fluoride (PVDF) binder and 10 grams of acetylene black to 50 grams of N-methylpyrrolidone (NMP), mix in a vacuum mixer into a uniform slurry, apply a coating of about 20 microns thick to each side of an aluminum foil, dry at 150° C., roll and crop to a size of 540×43.5 mm$^2$ to provide about 2.8 grams of LiFePO$_4$ as the active ingredient.

(b) Anode Active Material

Combine 100 grams of natural graphite with 5 grams of conductive acetylene black and 5 grams of polyvinylidene fluoride (PVDF) binder to 100 grams of N-methylpyrrolidone (NMP), mix in a vacuum mixer into a uniform slurry, apply a coating of about 12 microns thick to each side of a copper foil, dry at 90° C., roll and crop to a size of 500×44 mm$^2$ to provide about 2.6 grams of natural graphite as the active ingredient.

(c) Battery Assembly

Separately wind each of the cathode and anode active materials with polypropylene film into a lithium secondary battery core, followed by dissolving 1M LiPF$_6$ in a mixture of non-aqueous electrolyte solvent EC/EMC/DEC to provide a ratio of 1:1:1, inject and seal the electrolyte having a capacity of 3.8 g/Ah into the battery to provide separate lithium secondary batteries for the testing of examples B1-B6 and references B7-B9.

(2) Testing Cycle (a) Performance Test

Place each of the lithium secondary batteries B1-B9 on a test cabinet. Using a constant current charge of 0.1 C with an upper limit of 3.8 volts, charge each battery for 2.5 hours at constant voltage and set aside for 20 minutes. Using a current of 0.1 C discharge from 3.8 volts to 3.0 volts, record the battery discharge capacity, and then repeat the above steps 50 times. After the battery has been subjected to the 50 cycles of charge/discharge, record the before and after battery discharge capacity to calculate the rate of discharge capacity with the following equation:

Rate of discharge capacity=(Discharge capacity at 50$^{th}$ cycle/Initial discharge capacity)×100%

(b) Large Current Discharge Performance Test

Using a constant current charge of 0.1 C with an upper limit of 3.8 volts, charge each battery for 2.5 hours at constant voltage and set aside for 20 minutes. Separate use currents of 1 C, 2 C and 5 C with discharges from 3.8 volts to 3.0 volts, record the battery discharge capacity relative to the discharge capacity with 0.1 C to provide discharge capacity ratios, namely:

$C_{1C}/C_{0.1C}$: Current discharge capacity of 1 C from 3.8 volts to 3.0 volts relative to current discharge capacity of 0.1 C from 3.8 volts to 3.0 volts;

$C_{2C}/C_{0.1C}$: Current discharge capacity of 2 C from 3.8 volts to 3.0 volts relative to current discharge capacity of 0.1 C from 3.8 volts to 3.0 volts; and $C_{5C}/C_{0.1C}$: Current discharge capacity of 5 C from 3.8 volts to 3.0 volts relative to current discharge capacity of 0.1 C from 3.8 volts to 3.0 volts.

The testing cycle results for examples B1-B9 are shown in Table 2.

TABLE 2

Test results of LiFePO$_4$ composite cathode materials having trivalent iron compounds and reference samples.

| Sample number | Initial discharge capacity (mAh/g) | Recycling capacity after 50 cycles (%) | Discharge performance $C_{1C}/C_{0.1C}$ (%) | $C_{2C}/C_{0.1C}$ (%) | $C_{5C}/C_{0.1C}$ (%) |
|---|---|---|---|---|---|
| B1 | 145 | 92 | 98 | 94 | 90 |
| B2 | 142 | 90 | 98 | 94 | 90 |
| B3 | 148 | 95 | 98 | 95 | 92 |
| B4 | 148 | 95 | 98 | 95 | 91 |
| B5 | 143 | 92 | 98 | 96 | 92 |
| B6 | 146 | 94 | 98 | 95 | 92 |
| B7 | 116 | 82 | 97 | 87 | 67 |
| B8 | 126 | 85 | 97 | 88 | 72 |
| B9 | 124 | 86 | 97 | 89 | 74 |

Reference is now made to FIG. 3 illustrating a scanning electron microscope (SEM) image at 2000× magnification of a lithium iron phosphate cathode material according to example B1 of the presently disclosed invention. From the figure, it can be observed that the crystals of the LiFePO$_4$ composite cathode material are relatively uniform with uniform particle size distribution with majority of particles having diameters ranging between 1 to 3 microns.

Reference is now made to FIG. 4 illustrating an x-ray diffraction (XRD) pattern of the lithium iron phosphate cathode material according to example B1 of the presently disclosed invention having olivine-type crystal structure and good crystal growth and development.

From the data in Table 2, it can be observed that the LiFePO$_4$ composite cathode materials according to examples B1-B6 of the presently disclosed invention provide higher initial discharge capacity than references B7-B9. In addition, examples B1-B6 are able to maintain greater than 90% discharge capacity after 50 cycles. More importantly, the large current discharge performance of B1-B6 maintained, on average, greater than 98%, 94% and 90% at 1 C, 2 C, and 5 C discharge currents, respectively. Accordingly, the lithium iron phosphate cathode materials for lithium secondary batteries and methods of manufacturing such according to the presently disclosed invention provide superior performance relative to the reference samples and other similar lithium iron phosphate cathode materials currently on the market.

Although the invention has been described in detail with reference to several embodiments, additional variations and modifications exist within the scope and spirit of the invention as described and defined in the following claims.

What is claimed is:

1. A method of preparing a cathode material for lithium secondary batteries comprising:
    providing a mixture with at least one lithium compound, at least one iron compound, at least one phosphorous compound and a first carbon additive;
    first heating the mixture to a first temperature;
    second cooling the mixture to ambient temperature;
    providing a second carbon additive to the mixture, wherein the first and second carbon additives are selected from the group consisting of benzene naphthalene phenanthrene copolymer, benzene phenanthrene binary copolymer, benzene anthracene binary copolymer, poly benzene, soluble starch, polyvinyl alcohol, polypropylene, polypropylene amide, sucrose, glucose, urea, phenolic resin, furfural resin, urea-formaldehyde resin, epoxy resin, graphite and acetylene black; and
    third heating the mixture to a second temperature, wherein the second temperature is at least 80° C. higher than the first temperature.

2. The method of claim 1, wherein the first carbon additive and the second carbon additive has a weight ratio of about 2-10 to 1.

3. The method of claim 1, wherein the first carbon additive and the second carbon additive provide the cathode material with carbon content of about 1-15% by weight.

4. The method of claim 1, wherein the second carbon additive includes un-reacted portions of the first carbon additive.

5. The method of claim 1, wherein the lithium, iron and phosphorous compounds provide Li:Fe:P molar ratios of about 0.9-1.2:1:1.

6. The method of claim 1, wherein the at least one iron compound includes a trivalent iron compound.

7. The method of claim 6, wherein for every mole of trivalent iron compound, the amount of the first carbon additive results in approximately 5-10 grams of carbon.

8. The method of claim 1, further comprising providing an inert atmosphere for the first and second heating steps.

9. The method of claim 1, further comprising grinding the product from the first heating step before adding the second carbon additive.

10. A method of preparing a cathode material for lithium secondary batteries comprising:
    providing a mixture with at least one lithium compound, at least one iron compound, at least one phosphorous compound, at least one metal compound and a first carbon additive;
    first heating the mixture to a first temperature;
    second cooling the mixture to ambient temperature;
    providing a second carbon additive to the mixture, wherein the first and second carbon additives are selected from the group consisting of benzene naphthalene phenanthrene copolymer, benzene phenanthrene binary copolymer, benzene anthracene binary copolymer, poly benzene, soluble starch, polyvinyl alcohol, polypropylene, polypropylene amide, sucrose, glucose, urea, phenolic resin, furfural resin, urea-formaldehyde resin, epoxy resin, graphite and acetylene black; and
    third heating the mixture to a second temperature, wherein the second temperature is at least 80° C. higher than the first temperature.

11. The method of claim 10, wherein the first carbon additive and the second carbon additive has a weight ratio of about 2-10 to 1.

12. The method of claim 10, wherein the first carbon additive and the second carbon additive provide the cathode material with carbon content of about 1-15% by weight.

13. The method of claim 10, wherein the second carbon additive includes un-reacted portions of the first carbon additive.

14. The method of claim 10, wherein the lithium, metal, iron and phosphorous compounds provide Li:M:Fe:P molar ratios of about 0.9-1.2:0.01-0.05:0.95-0.99:1.

15. The method of claim 10, wherein the at least one iron compound includes a trivalent iron compound.

16. The method of claim 15, wherein for every mole of trivalent iron compound, the amount of the first carbon additive results in approximately 5-10 grams of carbon.

17. The method of claim 10, further comprising providing an inert atmosphere for the first and second heating steps.

18. The method of claim 10, further comprising grinding the product from the first heating step before adding the second carbon additive.

19. A method of preparing a cathode material for lithium secondary batteries comprising:
    providing a mixture with at least one lithium compound, at least one trivalent iron compound, at least one phosphorous compound and a first carbon additive;
    first heating the mixture to a first temperature;
    second cooling the mixture to ambient temperature;
    providing a second carbon additive to the mixture, wherein the first and second carbon additives are selected from the group consisting of benzene naphthalene phenanthrene copolymer, benzene phenanthrene binary copolymer, benzene anthracene binary copolymer, poly benzene, soluble starch, polyvinyl alcohol, polypropylene, polypropylene amide, sucrose, glucose, urea, phenolic resin, furfural resin, urea-formaldehyde resin, epoxy resin, graphite and acetylene black; and
    third heating the mixture to a second temperature, wherein the second temperature is at least 80° C. higher than the first temperature.

20. The method of claim 19, wherein the first carbon additive and the second carbon additive has a weight ratio of about 2-10 to 1.

* * * * *